United States Patent
Yang et al.

(10) Patent No.: US 10,917,821 B2
(45) Date of Patent: Feb. 9, 2021

(54) INTER-CELL HANDOVER METHOD AND CONTROLLER

(71) Applicant: HUAWEI TECHNOLOGIES CO., LTD., Shenzhen (CN)

(72) Inventors: Yang Yang, Shanghai (CN); Yinghao Jin, Shanghai (CN); Wei Tan, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/271,884

(22) Filed: Feb. 11, 2019

(65) Prior Publication Data
US 2019/0174362 A1 Jun. 6, 2019

Related U.S. Application Data

(63) Continuation of application No. PCT/CN2017/095394, filed on Aug. 1, 2017.

(30) Foreign Application Priority Data

Aug. 12, 2016 (CN) .......................... 2016 1 0666066

(51) Int. Cl.
*H04W 36/00* (2009.01)
*H04W 36/08* (2009.01)

(52) U.S. Cl.
CPC ....... *H04W 36/0072* (2013.01); *H04W 36/00* (2013.01); *H04W 36/0016* (2013.01);
(Continued)

(58) Field of Classification Search
CPC ............. H04W 36/0083; H04W 36/30; H04W 36/0094; H04W 36/00; H04W 36/0088; H04W 36/08; H04W 36/0016
See application file for complete search history.

(56) References Cited

U.S. PATENT DOCUMENTS

| | | | |
|---|---|---|---|
| 2010/0069071 A1* | 3/2010 | Simonsson | H04W 36/0016 455/436 |
| 2014/0087734 A1 | 3/2014 | Wang et al. | |
| 2016/0135098 A1 | 5/2016 | Ahluwalia et al. | |

FOREIGN PATENT DOCUMENTS

| | | |
|---|---|---|
| CN | 101064943 A | 10/2007 |
| CN | 101310554 A | 11/2008 |

(Continued)

OTHER PUBLICATIONS

Ericsson: "Mobility based on DL and UL measurements",3GPP Draft; R2-163999,May 22, 2016,total 3 pages.

(Continued)

*Primary Examiner* — Jae Y Lee
*Assistant Examiner* — Aixa A Guadalupe Cruz
(74) *Attorney, Agent, or Firm* — Kilpatrick Townsend & Stockton LLP

(57) ABSTRACT

Embodiments can provide an inter-cell handover method and a controller to shorten a handover delay. For achieving such, a target cell can be determined by a first controller of a source cell. The first controller can send a pre-handover request to a second controller, which may be a controller of the target cell. The pre-handover request can be configured for instructing the second controller to allocate a first resource for a cell handover to a terminal device. The first controller can send a handover command to the terminal device when the first controller determines that the terminal device meets a handover condition. The handover command can be configured for instructing the terminal device to be handed over from the source cell to the target cell based on the first resource.

8 Claims, 7 Drawing Sheets

(52) U.S. Cl.
CPC ... *H04W 36/0061* (2013.01); *H04W 36/0083* (2013.01); *H04W 36/08* (2013.01)

(56) References Cited

FOREIGN PATENT DOCUMENTS

| CN | 101426307 A | 5/2009 |
| CN | 101473676 A | 7/2009 |
| CN | 101835213 A | 9/2010 |
| CN | 101986751 A | 3/2011 |
| CN | 102740386 A | 10/2012 |
| CN | 105307209 A | 2/2016 |
| CN | 105704769 A | 6/2016 |
| EP | 2237607 A1 | 10/2010 |
| WO | 2008031258 A1 | 3/2008 |
| WO | 2015065352 A1 | 5/2015 |
| WO | 2015195323 A1 | 12/2015 |

OTHER PUBLICATIONS

3GPP TSG RAN WG2 Meeting #50,R2-060107, LG Electronics: "Intra-Access System (E-UTRAN) Mobility for LTE Active state", Sophia Antipolis, France, Jan. 9-13, 2006, total 3 pages. XP050130260.
3GPP TSG-RAN WG2 #50 meeting; R2-060078, Samsung: "Handover procedure for LTE Active Ues", Sophia-Antipolis, France, Jan. 9-Jan. 13, 2006, total 6 pages. XP007902976.
3GPP TSG RAN WG2 Meeting #50 ,R2-060107,LG Electronics Intra-Access System (E-UTRAN) Mobility for LTE Active state, total 4 pages.
Ericsson, PS Handover Support for GAN. 3GPP TSG-GERAN, Meeting #32 Sophia Antipolis, Nov. 13-17, 2006 , GP-062118, 36 pages.
CMCC, Qualcomm Incorporated, Text proposal on LTE TDD HeNB interference control. 3GPP TSG-RAN WG4 #AdHoc1 Sophia Antipolis, FR, Jan. 18-22, 2010, R4-100178, 21 pages.
Zhang Yifan, Optimization of Handover Algorithms and Research on Downlink Resource Allocation for High-Speed Railway LTE Systems. Beijing University of Posts and Telecommunications, Apr. 2015, 1 page.

* cited by examiner

INTER-CELL HANDOVER METHOD AND CONTROLLER

CROSS-REFERENCE TO RELATED APPLICATIONS

This application is a continuation of International Application No. PCT/CN2017/095394, filed on Aug. 1, 2017, which claims priority to Chinese Patent Application No. 201610666066.3, filed on Aug. 12, 2016. The disclosures of the aforementioned applications are hereby incorporated by reference in their entireties.

TECHNICAL FIELD

This application relates to the field of communications, and more specifically, to an inter-cell handover method and a controller.

BACKGROUND

In a current Long Term Evolution (Long Term Evolution, LTE) technology, user equipment (User Equipment, UE) needs to execute a cell handover procedure when moving in a network, to ensure service quality and communication continuity. The LTE handover procedure is a downlink measurement-based handover mechanism. In other words, each cell on a network side delivers a reference signal, and the UE measures the reference signal, and reports a measurement result in a form of a measurement report to the network side. The network side executes a measurement decision based on the measurement report. When it is determined that the UE needs to be handed over, a source cell negotiates with a target cell to prepare handover resources. After the handover preparation is completed, the network side controls the UE to be handed over.

It can be learned that in the downlink measurement-based handover mechanism, the network side can start to prepare the handover resources only when receiving the measurement report reported by the UE. The handover preparation inevitably causes a delay to an actual handover. However, with subsequent evolution of a mobile communications system, requirements of some services for a delay and reliability are higher compared with those in the LTE network. Therefore, a handover of the UE needs to be more timely, or a handover failure is easy to occur.

In view of this, the industry proposes an uplink measurement-based handover mechanism. Different from the downlink measurement-based handover mechanism, in the uplink measurement-based handover mechanism, a reference signal is sent by the UE, and the reference signal is measured on the network side. An uplink measurement-based handover procedure mainly includes the following steps:

1. A source cell monitors a reference signal sent by the UE, and when finding that the UE is close to an edge of a coverage area of the source cell, the source cell sends a measurement request message to a neighboring cell. The measurement request message carries conditions required for measuring the UE, for example, an identifier of the UE, a measurement report threshold, and a report interval.

2. The neighboring cell measures the UE based on the measurement request message, and sends a measurement result in a form of a measurement report to the source cell.

3. The source cell compares measurement results of neighboring cells based on measurement reports, to determine a target cell, and initiates a handover request to the target cell when the UE triggers a handover condition.

4. The target cell prepares for a handover, and sends an acknowledgement (ACK) message to the source cell when the preparation is completed, to indicate that the handover preparation is completed.

5. After receiving the acknowledgement message of the target cell, the source cell instructs the terminal device to execute the handover.

It can be learned from the foregoing procedure that in the uplink measurement-based handover mechanism, the network side does not need to wait for the UE to report the measurement report. This saves handover time to an extent. However, after the UE meets a handover trigger condition, the network side still needs to perform a handover preparation process. Therefore, the handover may not be performed in time.

SUMMARY

This application provides an inter-cell handover method and a network device to shorten a handover delay.

According to a first aspect, this application provides an inter-cell handover method, including: determining, by a first controller, a target cell, where the first controller is a controller of a source cell; sending, by the first controller, a pre-handover request to a second controller, where the second controller is a controller of the target cell, and the pre-handover request is used to instruct the second controller to allocate, to a terminal device, a first resource required for a cell handover; and sending, by the first controller, a handover command to the terminal device when determining that the terminal device meets a handover condition, where the handover command is used to instruct the terminal device to be handed over from the source cell to the target cell based on the first resource.

In an uplink measurement-based handover mechanism provided in the prior art, the terminal device sends an uplink reference signal, and a network side measures the reference signal, and feeds back a measurement result in a form of a measurement report to the controller of the source cell. After the terminal device triggers a handover, the controller of the source cell selects a neighboring cell as the target cell based on the measurement report, and negotiates with the target cell to prepare resources required for the handover of the terminal device. The target cell sends acknowledgement information to the source cell after completing handover preparation. Then the terminal device may enter a handover execution stage, to perform a cell handover.

In this embodiment of this application, when determining that the terminal device meets a measurement condition, the first controller (that is, the controller of the source cell) sends a pre-handover command to the second controller (that is, the controller of the target cell). After receiving the pre-handover command, the second controller allocates (or referred to as reserve) a resource to the terminal device for a cell handover. Therefore, when the terminal device triggers the handover condition, the cell handover can be directly executed based on the allocated resource, and a handover delay can be shortened compared with the prior art.

In a possible implementation, the determining, by a first controller, a target cell includes: sending, by the first controller, a measurement request message to a neighboring cell of the source cell, where the measurement request message carries first indication information, and the first indication information is used to indicate a second resource that meets a quality of service requirement of the terminal device; receiving, by the first controller, at least one measurement report sent by at least one first cell, where the at least one measurement report is in a one-to-one correspondence with the at least one first cell, each measurement report includes second indication information, the second indication information is used to indicate a second resource that the corresponding first cell can provide for the terminal device, and the at least one first cell is some or all neighboring cells of the source cell; and determining, by the first controller, the target cell from the at least one first cell based on the second indication information in the at least one measurement report.

It may be understood that the source cell may have one or more neighboring cells.

When the source cell has only one neighboring cell, if the neighboring cell can provide a resource that meets the quality of service requirement of the terminal device, before the terminal device triggers the handover, the neighboring cell has pre-allocated the resources required for the handover to the terminal device. Therefore the terminal device can be directly handed over after triggering the handover. However, in the uplink measurement-based handover mechanism provided in the prior art, after the terminal device triggers the handover, the source cell and the target cell start to negotiate to prepare the resources required for the handover, and the terminal device can be handed over in the control of the controller of the source cell provided that the target cell completes the preparation, and sends an acknowledgement message to the source cell. Therefore, the handover delay can be shortened.

When the source cell has a plurality of neighboring cells, if some neighboring cells can provide a resource that meets the quality of service requirement of the terminal device, these neighboring cells indicate, to the source cell in a form of a measurement report, resources that these neighboring cells can provide (that is, corresponding to a function of the second indication information). Therefore, when determining the target cell, the source cell may select, based on measurement reports fed back by the plurality of neighboring cells, a neighboring cell that receives a signal with higher quality from the terminal device or can provide more sufficient resources for the terminal device, to more accurately select the target cell, thereby improving an inter-cell handover success rate of the terminal device. In addition, some neighboring cells that cannot provide a resource meeting the quality of service requirement of the terminal device do not send a measurement report to the source cell. In this way, a quantity of measurement reports on an X2 interface is reduced, and system overheads of the X2 interface are reduced.

In a possible implementation, the neighboring cell of the source cell further includes a second cell, and the second cell is a cell that does not send a measurement report to the first controller when it is determined that the cell cannot provide the second resource required by the terminal device.

In a possible implementation, some of the at least one measurement report further include third indication information, and the third indication information is used to indicate that first cells corresponding to the some measurement reports cannot provide all second resources required by the terminal device.

In a possible implementation, the some measurement reports further include fourth indication information, and the fourth indication information is used to indicate at least one of the following information: congestion information, downspeeding information, optional feature information, and function information.

When the neighboring cell cannot provide all the second resources required by the terminal device, the neighboring cell indicates a resource or load status of the neighboring cell to the source cell. The source cell may determine the target cell with reference to the resource or load status of the neighboring cell, so that the selected target cell is more accurate. Especially when all the plurality of neighboring cells cannot provide all the second resources required by the terminal device, this manner can reduce a cell handover failure rate.

According to a second aspect, this application provides an inter-cell handover method, including: receiving, by a second controller, a pre-handover request sent by a first controller, where the first controller is a controller of a source cell in which a terminal device is located, the second controller is a controller of a first cell, the first cell is a neighboring cell of the source cell, the pre-handover request is sent to the second controller after the first controller determines the first cell as a target cell; and allocating, by the second controller based on the pre-handover request, a first resource required for a cell handover to the terminal device, so that the first controller sends a handover command to the terminal device when determining that the terminal device meets a handover condition, to instruct the terminal device to be handed over from the source cell to the target cell based on the first resource.

In a possible implementation, before the receiving, by a second controller, a pre-handover request sent by a first controller, the method further includes: receiving, by the second controller, a measurement request message sent by the first controller, where the measurement request message carries first indication information, and the first indication information is used to indicate a second resource that meets a quality of service requirement of the terminal device; determining, by the second controller, a second resource that the first cell can provide for the terminal device; and sending, by the second controller, a measurement report to the first controller, where the measurement report includes second indication information, and the second indication information is used to indicate the second resource that the first cell can provide for the terminal device.

In a possible implementation, the measurement report further includes third indication information, and the third indication information is used to indicate that the first cell cannot provide all second resources required by the terminal device.

In a possible implementation, the measurement report further includes fourth indication information, and the fourth indication information is used to indicate at least one of the following information: congestion information, downspeeding information, optional feature information, and function information.

According to a third aspect, this application provides a controller, configured to execute the method according to the first aspect or any possible implementation of the first aspect. Specifically, the controller includes units configured to execute the method according to the first aspect or any possible implementation of the first aspect.

According to a fourth aspect, this application provides a controller, configured to execute the method according to the second aspect or any possible implementation of the second aspect. Specifically, the controller includes units configured to execute the method according to the second aspect or any possible implementation of the second aspect.

According to a fifth aspect, this application provides a controller, including a receiver, a transmitter, a processor, and a memory. The memory is configured to store an instruction, the processor is configured to execute the instruction stored in the memory, to control the receiver to receive a signal, or control the transmitter to send a signal. When the instruction stored in the memory is executed, the processor executes the method according to the first aspect or any possible implementation of the first aspect.

According to a sixth aspect, this application provides a controller, including a receiver, a transmitter, a processor, and a memory. The memory is configured to store an instruction, the processor is configured to execute the instruction stored in the memory, to control the receiver to receive a signal, or control the transmitter to send a signal. When the instruction stored in the memory is executed, the processor executes the method according to the second aspect or any possible implementation of the second aspect.

Optionally, the memories in the foregoing fifth aspect and the sixth aspect may be independent, or may be integrated with the processor. When the processor is implemented by hardware, for example, a logic circuit or an integrated circuit, the processor may be connected to other hardware without the memory.

According to a seventh aspect, this application provides a computer readable medium to store a computer program, and the computer program includes an instruction used to execute the method according to the first aspect or any possible implementations of the first aspect.

According to an eighth aspect, this application provides a computer readable medium to store a computer program, and the computer program includes an instruction used to execute the method according to the second aspect or any possible implementations of the second aspect.

In the inter-cell handover method provided in this application, when determining that the terminal device meets the measurement condition, the first controller (that is, the controller of the source cell) sends the pre-handover command to the second controller (that is, the controller of the target cell). After receiving the pre-handover command, the second controller allocates (or referred to as reserve) a resource to the terminal device for a cell handover. Therefore, when the terminal device triggers the handover condition, the cell handover can be directly executed based on the allocated resource, and a handover delay can be shortened.

DESCRIPTION OF EMBODIMENTS

The following describes the technical solutions provided in this application with reference to the accompanying drawings.

The technical solutions of this application may be applied to various communications systems, such as a Global System for Mobile Communications (Global System for Mobile communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, a Long Term Evolution Advanced (Long Term Evolution Advanced, LTE-A) system, a Universal Mobile Telecommunications System (Universal Mobile Telecommunications System, UMTS), and a 5G system.

It should be understood that in the embodiments of this application, user equipment (User Equipment, UE) includes but not limited to a mobile station (Mobile Station, MS), a mobile terminal (Mobile Terminal), a mobile telephone (Mobile Telephone), a handset (handset), portable equipment (portable equipment), and the like. The user equipment may communicate with one or more core networks by using a radio access network (Radio Access Network, RAN). For example, the user equipment may be a mobile phone (or referred to as a "cellular" phone), or a computer having a wireless communication function; or the user equipment may be a portable, pocket-sized, handheld, computer built-in, or in-vehicle mobile apparatus.

It should be noted that, in the embodiments of this application, the numbers "first" and "second" are merely intended to distinguish different objects, for example, to distinguish different resources, information, or the like, and shall not constitute any limitation on the protection scope of the embodiments of this application.

Figure 1:
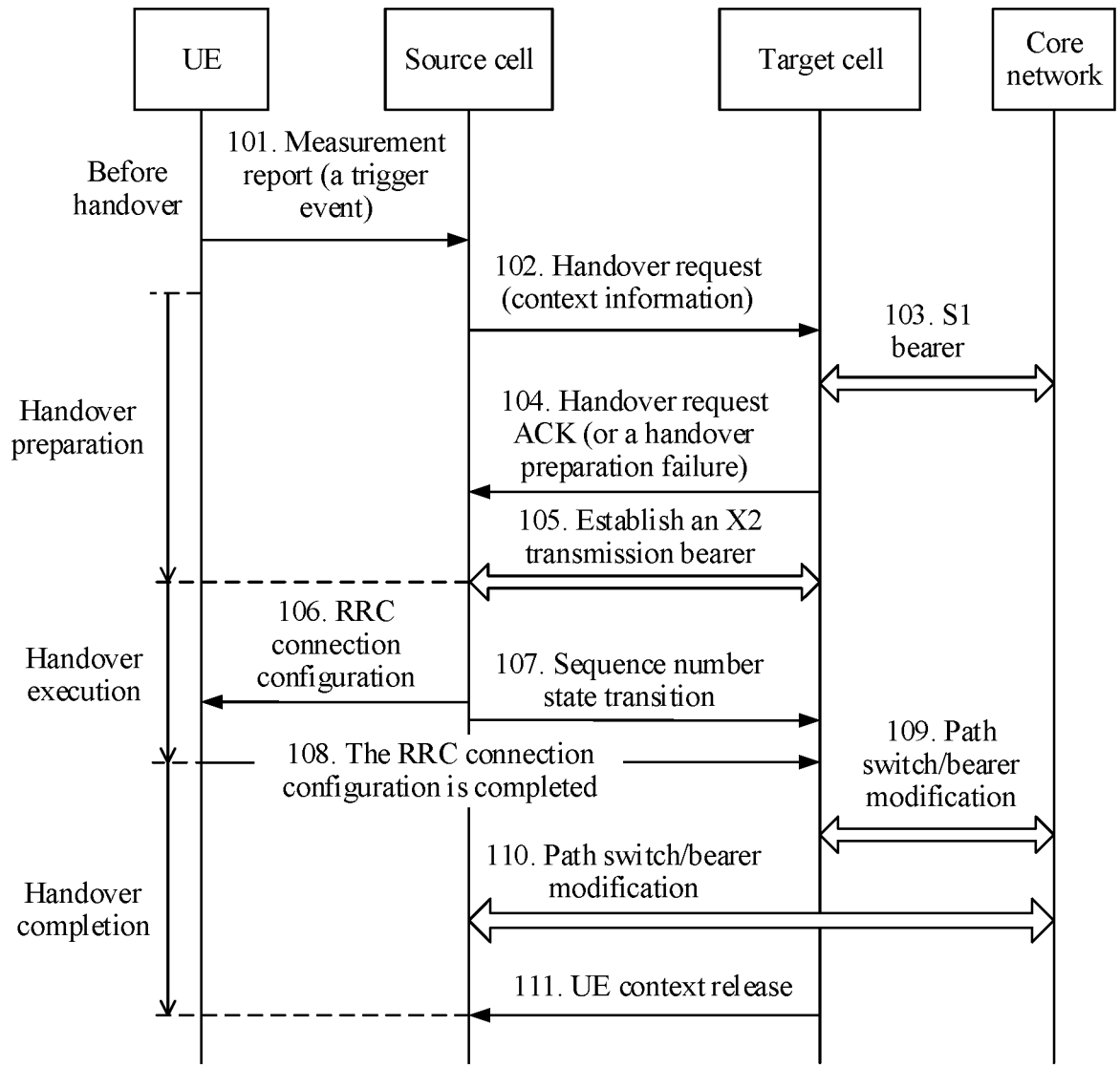
FIG. 1 is a schematic interaction diagram of a downlink measurement-based handover procedure in the prior art.

FIG. 1 is a schematic flowchart of a downlink measurement-based handover procedure in the LTE. As shown in FIG. 1, the handover procedure includes three stages: handover preparation, handover execution, and handover completion.

101. UE sends a measurement report to a source cell based on a trigger event.

It should be understood that in the LTE, the UE performs related measurement based on a measurement configuration message delivered by an eNB, and reports a measurement result to the eNB. That the UE sends the measurement report to the source cell means that the UE sends the measurement report to the eNB of the source cell.

102. The source cell sends a handover request to a target cell.

The handover request carries context information of the UE.

103. The target cell establishes an S1 bearer with a core network based on context information of the UE.

104. The target cell sends a handover request ACK to the source cell.

105. The source cell establishes an X2 transmission bearer with the target cell.

106. The source cell sends a radio resource control (Radio Resource Control, RRC) connection configuration to the UE.

107. The source cell sends sequence number state transition to the target cell.

108. The RRC connection configuration is completed.

109. Path switch or bearer modification is performed between the target cell and the core network.

110. Path switch or bearer modification is performed between the source cell and the core network.

111. The source cell releases the context information of the UE, and the UE executes a random access process for the target cell, to establish a connection. So far, the handover is completed.

It should be noted that for specific implementation of the foregoing steps, refer to the prior art, and details are not described herein.

In the prior art, when the UE moves in a network, mobility management needs to be performed on the UE to ensure service continuity of the UE. For example, when the UE moves from the source cell to the target cell, inter-cell handover needs to be executed in time.

However, it can be learned from the foregoing handover procedure that, in the LTE, mobility management is performed on the UE based on downlink measurement. In other words, to implement mobility management on the UE, each cell in the network sends a downlink reference signal for measurement performed by the UE (therefore, this handover manner is also referred to as downlink measurement-based handover). The UE reports, based on the trigger event, the measurement result in a form of a measurement report to a network side, and the network side executes a handover decision based on the measurement report, to hand over the UE to a cell with better quality of service.

In the foregoing downlink measurement-based handover procedure, the network side needs to wait for the UE to report the measurement report, and then starts to perform a handover preparation procedure. This may cause the following problems: for example, the measurement report is sent on an air interface, and brings overheads on the air interface. The overheads are relatively large especially when signal quality in a handover area has a severe fluctuation. For another example, before receiving the measurement report of the UE, the network side cannot learn a handover requirement of the UE, and handover preparation is performed after the handover decision is executed. Consequently, handover preparation time causes a handover delay to actual handover execution. If the network side needs to predict the handover requirement of the UE and perform handover preparation in advance, the UE needs to report the measurement report in advance, to obtain a signal quality change status in advance, so that the network side can make the handover decision in advance. However, this may cause an increasing quantity of measurement reports sent by the UE, and increasing overheads on the air interface. For another example, if a resource of the target cell is not enough to meet a handover requirement, the source cell needs to receive a handover preparation failure (Handover preparation failure) indication of the target cell to perform subsequent processing, and a handover delay is relatively large.

To resolve the foregoing problems, an uplink measurement-based handover mechanism is proposed in the prior art, to perform mobility management on the UE.

For ease of description, a concept of a hyper cell (hyper cell, also referred to as a cell cluster) is first introduced. On the basis of the concept of the hyper cell, a problem of why mobility management of the UE is difficult with subsequent evolution of a system is described. One hyper cell may be configured with a hyper cell ID, and may include a plurality of intra-frequency and/or inter-frequency transmission points (Transmission Point, TP). Optionally, in an embodiment, the hyper cell may include only one TP. Alternatively, the hyper cell may include a plurality of cells (Optionally, in an embodiment, the hyper cell may include only one cell). It may be understood that an ID of the TP (or the cell) in the hyper cell and an ID of the hyper cell may be consistent, or may be separately configured. The UE moves in the hyper cell, and if the prior-art mobility management manner is still used, because each TP is corresponding to one or more cells (or small cells), the UE hands over between cells frequently.

It should be noted that in this embodiment of this application, the TP is also referred to as a transmit reception point (Transmit Reception Point, TRP).

However, in a subsequent evolution process of a mobile communications system, more features may emerge compared with a 4G network. For example, requirements of some services for a delay and reliability are higher. To meet massive data communication requirements, massive transmission points TPs may be deployed in a hotspot region in an ultra dense manner, and a coverage area of each TP is reduced. Under this change, if the downlink measurement-based handover mechanism is still used, mobility management of the UE is difficult. For example, in the hotspot region, the UE needs to measure massive TPs, and because the coverage area of the TP is small, the UE is likely to move out of a coverage area of a TP quickly. This may cause a handover failure because handover is not performed in time. For another example, due to the ultra dense cell deployment, massive air interface signaling is inevitably generated in measurement report reporting and handover operations, and a large quantity of air interface resources and network processing resources are consumed. For another example, requirements for a network capacity and a connection quantity are higher, and air interface resources are more scarce; and so on. Because of the foregoing features, a handover of the UE needs to be more timely, or a handover failure is easier to occur.

Figure 2:
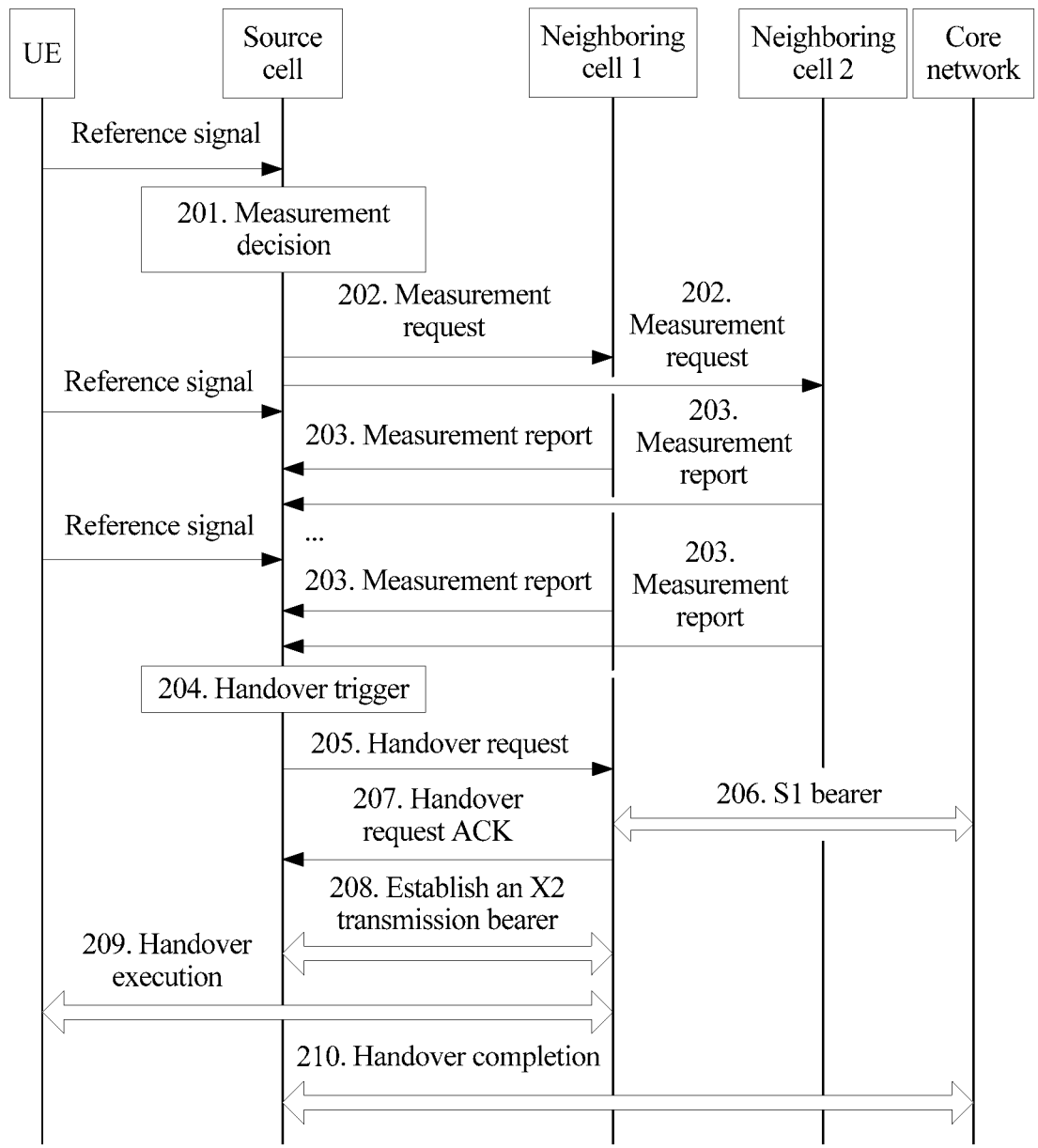
FIG. 2 is a schematic interaction diagram of an uplink measurement-based handover procedure in the prior art.

With reference to FIG. 2, the following describes an uplink measurement-based handover procedure.

It should be understood that in this embodiment of this application, information exchanged between a source cell and a target cell is transmitted by using respective controllers of the source cell and the target cell. For brevity, both "a cell sends information (or a message)" and "a cell receives information (or a message)" described in the following indicate that the cell receives or sends the information (or the message) by using a controller of the cell.

FIG. 2 is a schematic interaction diagram of an uplink measurement-based handover procedure in the prior art. As shown in FIG. 2, the method mainly includes step 201 to step 210.

201. A source cell executes a measurement decision.

When UE sends an uplink reference signal, the source cell monitors the reference signal of the UE. When the UE meets a measurement condition, for example, the UE is close to an edge of a coverage area of the source cell, or signal quality of the reference signal of the UE is lower than a preset threshold, the source cell executes the measurement decision.

202. The source cell sends a measurement request message to a neighboring cell.

The measurement request message carries information required for measuring the UE, for example, an identifier of the UE, a measurement report threshold, and a report interval.

203. The neighboring cell sends a measurement report to the source cell.

204. Handover trigger.

205. The source cell sends a handover request to a target cell.

206. The target cell establishes an S1 bearer with a core network.

The target cell prepares for the handover.

207. After completing resource preparation, the target cell sends a handover request ACK to the source cell.

208. The source cell and the target cell establish an X2 transmission bearer.

209. The source cell sends a handover execution instruction to the UE.

210. The source cell initiates release to the UE, and the UE executes a random access process for the target cell, to establish a connection. So far, the handover is completed.

It can be learned from the foregoing steps that compared with the downlink measurement-based handover procedure in the LTE, in the uplink measurement-based handover procedure, the UE sends the reference signal, the network side measures the uplink reference signal sent by the UE, and one or more proper TPs are selected for the UE based on the measurement result to perform data transmission. In other words, in a process in which the UE moves in the hyper cell, tasks of measuring the reference signal and a TP handover may be completed by the network side, so that the UE cannot sense a change of a TP. This can ensure service continuity, and the UE does not need to bear heavy measurement tasks and frequently report measurement reports, thereby reducing air interface overheads.

However, the uplink measurement-based handover mechanism still has the following problems:

1. When the UE meets a handover trigger condition, the network side needs to perform a measurement preparation process, and consequently, the handover may not be performed in time.

2. Because there are a plurality of points measuring the reference signal of the UE, and after the measurement is completed, measurement reports need to be sent to the source cell by using an X2 interface, this brings some air interface overheads.

For the foregoing prior-art problems existing in the uplink measurement-based handover procedure, with reference to FIG. 3 to FIG. 6, the following describes in detail an inter-cell handover method in the embodiments of this application.

First, a system architecture in the embodiments of this application is described.

Figure 3:
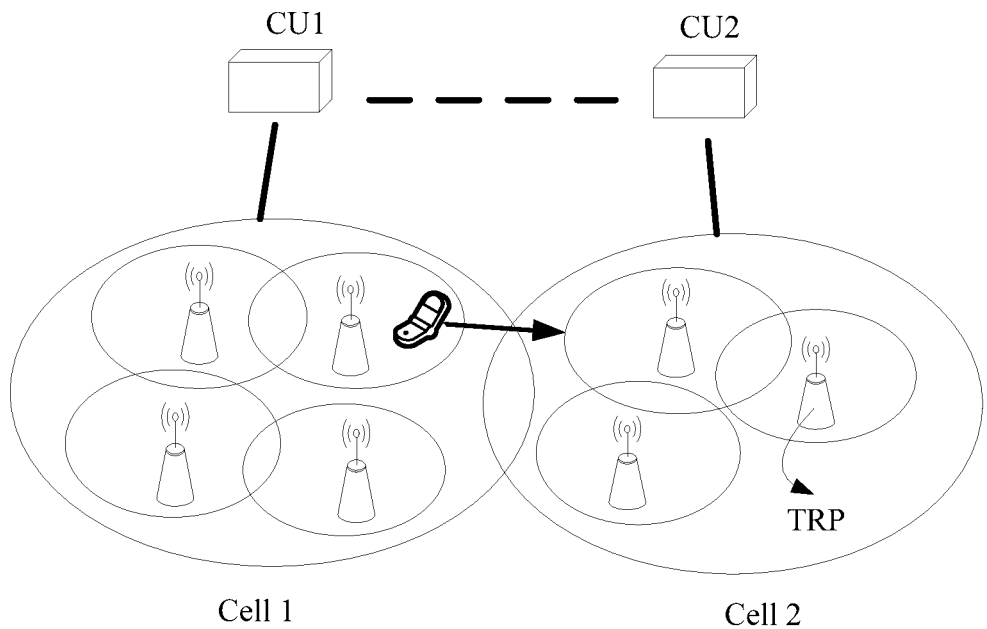
FIG. 3 is a schematic diagram of a system architecture according to an embodiment of this application.

FIG. 3 is a schematic diagram of a system architecture according to an embodiment of this application. In the architecture shown in FIG. 3, an architecture of a hyper cell has only one layer, that is, only a controller (controller) is deployed. In this architecture, all TRPs in the hyper cell are connected to the controller, and functions of RRC, Packet Data Convergence Protocol (Packet Data Convergence Protocol, PDCP), Radio Link Control (Radio Link Control, RLC), and (Radio Link Control, MAC) are all deployed on the controller.

Figure 4:
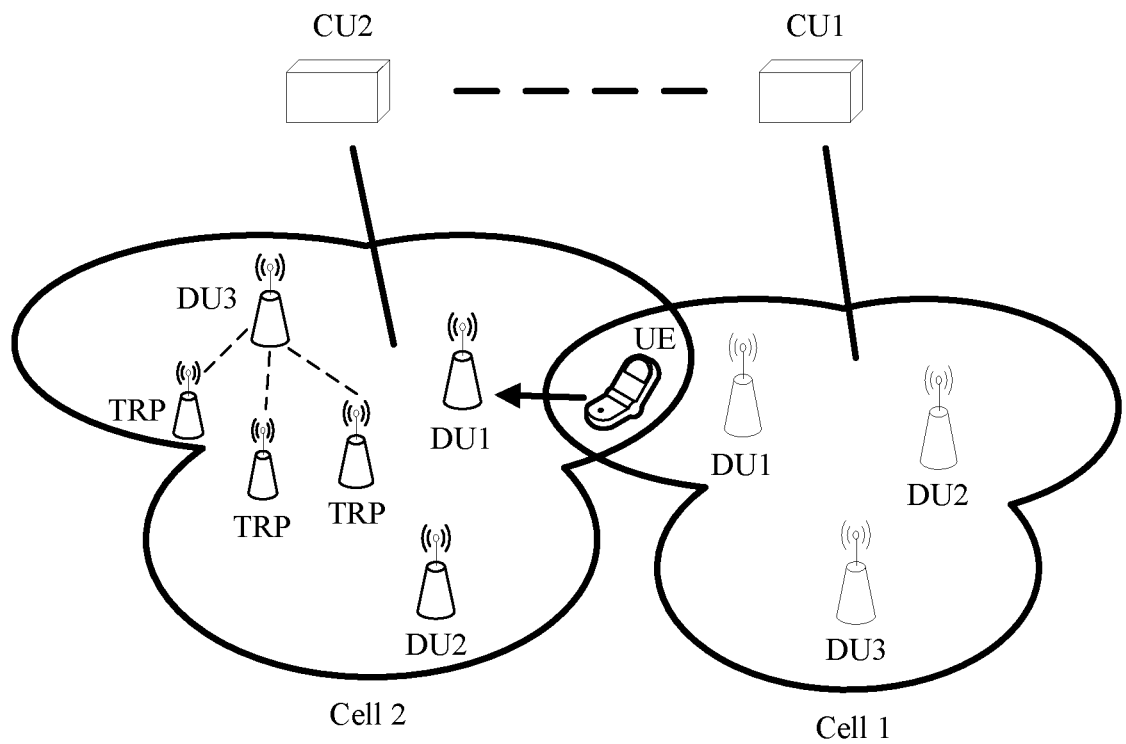
FIG. 4 is a schematic diagram of another system architecture according to an embodiment of this application.

FIG. 4 is a schematic diagram of another system architecture according to an embodiment of this application. In the architecture shown in FIG. 4, an architecture of a hyper cell has two layers, that is, both a central unit (Central Unit, CU) and a distributed unit (Distributed Unit, DU) are deployed, and one DU may be connected to one or more TRPs. In this architecture, RRC and PDCP may be deployed on the CU, and MAC may be deployed on the DU. Measurement of an uplink reference signal sent by UE is executed and completed by the DU. The DU needs to report a measurement result to the CU, measurement control information is delivered by the CU to the DU, and the DU delivers the measurement control information to the TRP.

It should be noted that in the system architectures shown in FIG. 3 and FIG. 4, that a CU1 has only one neighboring CU (that is, a CU2) is used as an example. Obviously, the CU1 may have a plurality of neighboring CUs, and this embodiment of this application sets no specific limitation thereto.

It should be further noted that in this embodiment of this application, two cells in which a handover is performed have no common radio access network controller (Radio Access Network controller, RAN controller).

In addition, a cell 1 and a cell 2 shown in FIG. 3 and FIG. 4 may be hyper cells described above.

Figure 5:
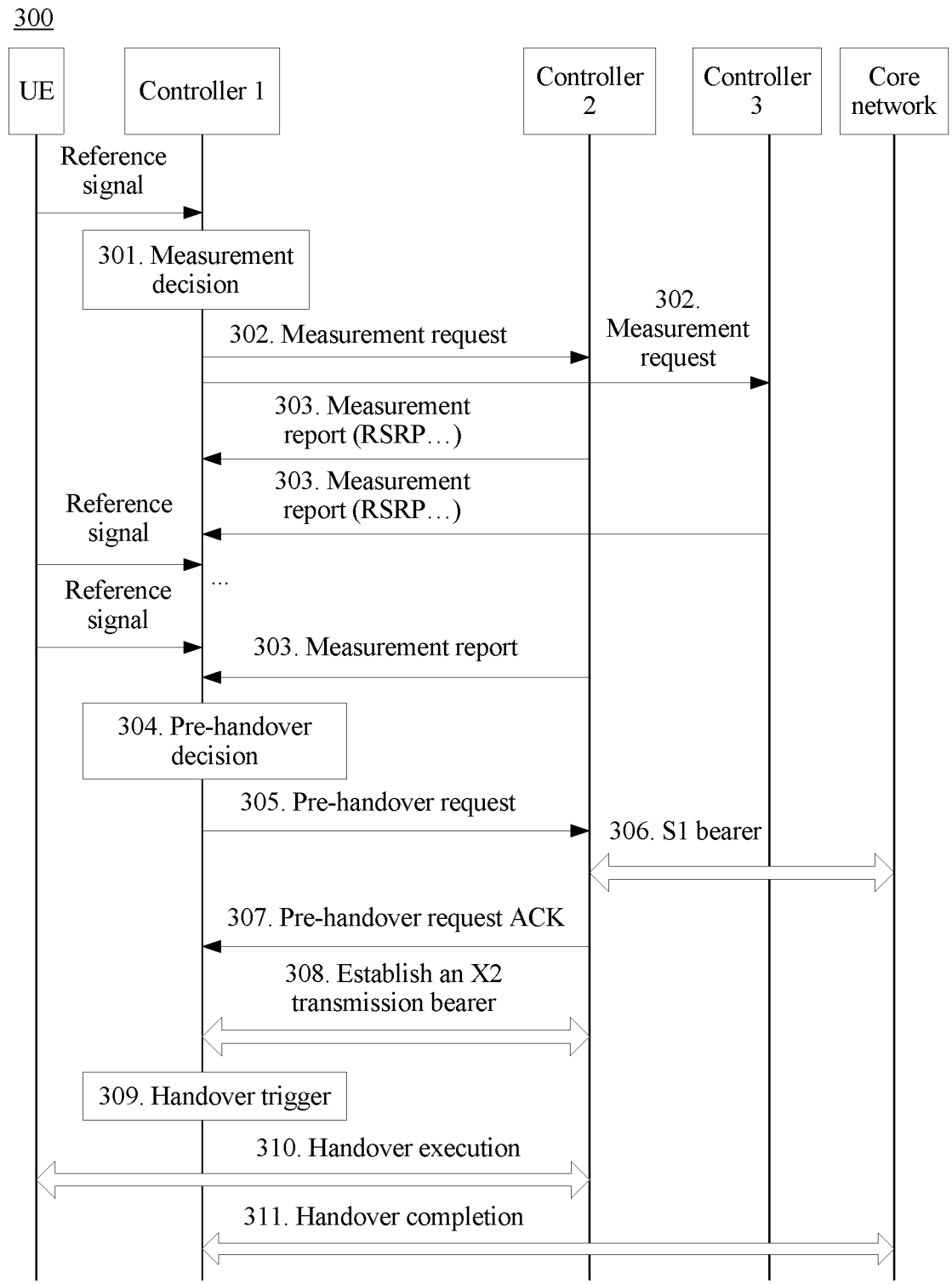
FIG. 5 is a schematic interaction diagram of an inter-cell handover method in a system architecture according to an embodiment of this application.

FIG. 5 is a schematic interaction diagram of an inter-cell handover method 300 in a system architecture according to an embodiment of this application. As shown in FIG. 5, the method 300 mainly includes step 301 to step 310.

First, for ease of understanding and description, in the following embodiment, without loss of generality, a controller 1 is used as an example of a first controller and a controller 2 is used as an example of a second controller to describe in detail the inter-cell handover method in this embodiment of this application.

301. The controller 1 executes a measurement decision.

It should be noted that the inter-cell handover method in this embodiment of this application is based on an uplink measurement mechanism. In step 301, a process in which the controller 1 executes the measurement decision when UE sends an uplink reference signal is the same as a process of executing a handover decision based on uplink measurement in the prior art. For step 301, refer to the foregoing description of the measurement decision in step 201.

Optionally, the uplink reference signal sent by the UE herein may be a beacon signal.

It should be understood that the executing, by the controller 1, the measurement decision is determining whether to initiate a UE handover procedure. If a handover is to be performed, a target cell is determined.

302. The controller 1 sends a measurement request message to the controller 2 and a controller 3.

The measurement request message carries first indication information, and the first indication information is used to indicate a second resource that meets a quality of service requirement of the UE.

It should be understood that the measurement request message may further carry a UE identifier ID, a measurement object, a measurement report threshold, a measurement report interval, and quality of service (Quality of Service, QoS) related information of the UE. The QoS related information of the UE may include an aggregated maximum bit rate (Aggregated Maximum Bit Rate, AMBR), a delay requirement (delay requirement), a service type (service type), and the like of the UE.

It should be further understood that the controller 3 herein is used as an example of a controller of a neighboring cell of a source cell.

Optionally, in an embodiment, the measurement request message carries the first indication information, and the first indication information is used to indicate the second resource that meets the quality of service requirement of the UE.

It should be understood that in this embodiment of this application, the second resource is a time domain resource, a frequency domain resource, a delay requirement (delay requirement), a UE service type (service type), a UE aggregated maximum bit rate (Aggregated Maximum Bit Rate, AMBR), and the like that meet the quality of service requirement of the UE.

303. The controller 2 and the controller 3 send measurement reports to the controller 1.

Specifically, the controller 2 and the controller 3 measure, based on the measurement request message sent by the controller 1, the reference signal sent by the UE, and feed back the measurement results in a form of a measurement report to the controller 1.

The measurement report may include a reference signal receiving power (Reference Signal Receiving Power, RSRP), signal quality of the reference signal, the UE ID, and the like.

It should be noted that the controller 2 and the controller 3 may send the measurement reports to the controller 1 based on an interval or based on a preset threshold. This embodiment of this application does not set any limitation thereto.

Optionally, in this embodiment of this application, the measurement report sent by the neighboring cell to the source cell carries second indication information, and the second indication information is used to indicate, to the source cell, a second resource that the neighboring cell can provide for the UE.

304. The controller 1 executes a pre-handover decision.

The controller 1 executes the pre-handover decision based on a plurality of measurement reports sent by neighboring cells, to determine the target cell. After the controller 1 determines the target cell, step 305 is executed.

It may be understood that executing the pre-handover decision is that the controller determines whether the terminal device needs to perform a cell handover. If the handover needs to be performed, the controller 1 needs to select the target cell from the neighboring cells.

That a neighboring cell 1 is determined as the target cell is used as an example to describe the following steps.

305. The controller 1 sends a pre-handover request to the controller 2.

It should be understood that in this embodiment of this application, the pre-handover request is used to instruct the target cell to allocate (or referred to as reserve), to the terminal device, a first resource required for a cell handover.

It should be further understood that in this embodiment of this application, the first resource includes a radio resource and a physical layer resource required by the UE to perform a cell handover, for example, an RRC resource, a data radio bearer (Data Radio Bearer, DRB) resource, a cell radio network temporary identifier (Cell Radio Network Temporary Identifier, C-RNTI), and a dedicated random access sequence.

Specifically, after the controller 1 determines the target cell, the controller 1 sends the pre-handover request (Pre Handover Request, Pre HO Request) to a controller of the target cell (that is, the controller 2). The pre-handover request carries handover preparation related information, for example, X2 and S1 signaling context reference of the UE (UE Context), a UE security capability (UE Security Capability), an evolved radio access bearer identifier (Evolved Radio Access Bearer Identifier, E-RAB ID), an access stratum security base key (Access security base key), a physical layer identifier of the source cell, message authentication code, and a target cell identifier.

306. The controller 2 establishes an S1 bearer with a core network.

The controller 2 receives the pre-handover request sent by the controller 1, and establishes the S1 bearer with the core network based on the handover preparation information carried in the pre-handover request. In addition, the controller 2 calculates an access stratum security key (Access security key), reserves an RRC resource and a data radio bearer (Data Radio Bearer, DRB) resource, allocates a dedicated random access sequence, and so on based on the UE context information.

307. After completing resource preparation, the controller 2 sends a pre-handover request ACK to the controller 1.

It should be understood that in step 307, the controller 2 sends the pre-handover request ACK (Pre HO Request ACK) to the controller 1, to notify the controller 1 that the resource for a cell handover has been prepared. The Pre HO Request ACK carries the E-RAB ID, a tunnel endpoint identifier (Tunnel Endpoint Identifier, TEID), a target UE identifier, a target DRB ID, an access stratum security algorithm (AS Security Algorithm), and the like.

308. The controller 1 establishes an X2 transmission bearer with the controller 2.

It should be understood that the X2 transmission bearer is a data plane bearer between cells. After establishing the X2 transmission bearer, the source cell and the target cell prepare to forward packets (Packets).

It should be noted that for the establishment of the X2 transmission bearer, refer to the prior art, and details are not described herein.

309. A terminal device triggers a handover condition.

It should be understood that in an uplink measurement-based handover mechanism, when the controller 1 determines that the terminal device meets the handover condition (for example, the controller 1 detects that the UE is in an edge of a network, or a value obtained by subtracting quality of a UE reference signal received by the controller 2 from quality of a UE reference signal received by the controller 1 is less than a preset threshold), a handover procedure is triggered.

Specifically, the controller 1 sends a handover command (handover command) to the UE, to control the UE to enter a handover execution procedure.

310. Handover execution.

In step 310, the UE receives the handover command of the controller 1, and hands over from the source cell to the target cell. Specifically, after receiving the handover command sent by the controller 1, the UE synchronizes with the target cell, calculates a key required in the target cell, configures a security algorithm that is selected by a network side and that is used in the target cell, and so on.

311. Handover completion.

After the UE accesses the target cell, the controller 2 sends release instruction information to the controller 1, to instruct the controller 1 to release the context information of the UE. So far, the handover is completed.

It can be learned from the foregoing handover procedure that in this embodiment of this application, when the controller of the source cell determines that the terminal device meets the measurement condition, the controller of the source cell sends a pre-handover command to the controller of the target cell, to instruct the controller of the target cell to prepare resources for the terminal device to perform a cell handover. Therefore, when the terminal device meets the handover condition, the controller of the source cell may directly control the terminal device to perform the cell handover, and a handover delay is shortened.

It may be understood that the inter-cell handover method in this embodiment of this application is based on the uplink measurement mechanism. In the uplink measurement mechanism, because signal quality measurement is performed on a network side, the network side (for example, the controller 1) can monitor a signal quality change status of the terminal device in time, and can well predict, especially with reference to historical information of the terminal device (for example, a track, a service type, a moving speed, a signal fluctuation rule, and the like of the terminal device) that a handover is about to occur. Therefore, before the terminal device triggers the handover condition, the controller of the source cell negotiates resource reservation with the controller of the target cell (that is, corresponding to the pre-handover process in this embodiment of this application), and when the terminal device meets the handover condition, the handover procedure can be directly executed.

Figure 6:
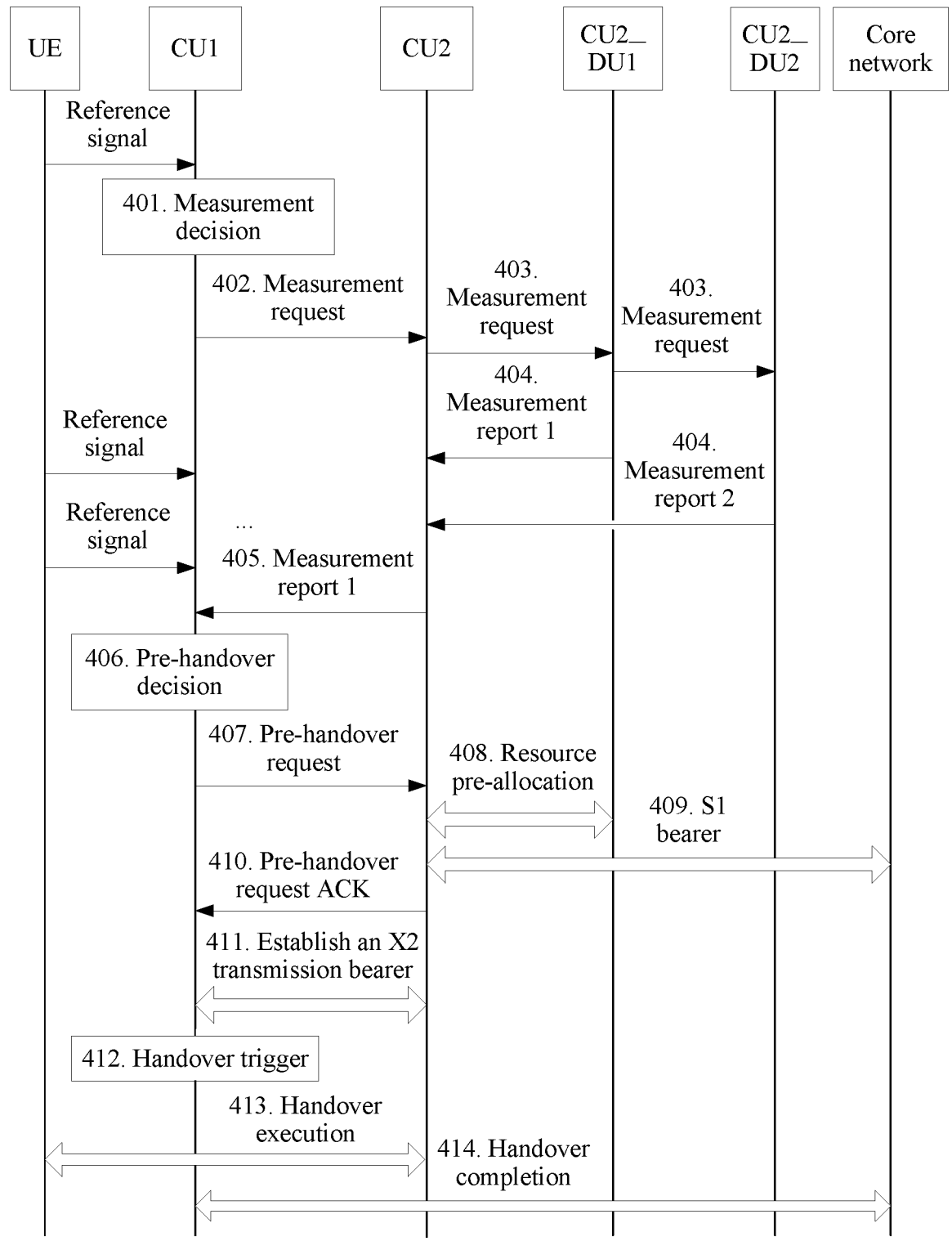
FIG. 6 is a schematic interaction diagram of an inter-cell handover method in another system architecture according to an embodiment of this application.

It should be noted that the foregoing handover procedure is described by using the system architecture shown in FIG. 3 as an example. As described above, the system architecture in this embodiment of this application may be an architecture with two layers (as shown in FIG. 4). With reference to FIG. 6, the following describes a handover procedure of the inter-cell handover method in this embodiment of this application in the system architecture shown in FIG. 4.

FIG. 6 is a schematic interaction diagram of the inter-cell handover method 300 in another system architecture according to an embodiment of this application. As shown in FIG. 6, the method 300 mainly includes step 401 to step 414.

401. A CU1 executes a measurement decision.

402. The CU1 sends a measurement request message to a CU2.

403. The CU2 sends a measurement request to a DU1 and a DU2 in the CU2.

404. The DU1 and the DU2 send measurement reports to the CU2.

For ease of description, the measurement report sent by the DU1 is recorded as a measurement report 1, and the measurement report sent by the DU2 is recorded as a measurement report 2.

405. The CU2 compares measurement results in the measurement reports of the DU1 and the DU2, selects one measurement report to feed back to the CU1.

Specifically, the CU2 may select a measurement report of a cell with better signal quality and more sufficient resources and report the measurement report to the CU1.

That the CU2 feeds back the measurement report 1 to the CU1 is used as an example in the following to describe consequent steps.

406. The CU1 executes a pre-handover decision.

407. The CU1 sends a pre-handover request to the CU2.

408. The CU2 instructs the DU1 to perform resource pre-allocation for a handover of UE.

409. The CU2 establishes an S1 bearer with a core network.

410. The CU2 sends a pre-handover request ACK to the CU1.

411. The CU1 establishes an X2 transmission bearer with the CU2.

It should be noted that in LTE, the S1 bearer is a bearer between a base station and the core network. The X2 transmission bearer is a bearer between base stations. The S1 bearer and the X2 transmission bearer herein are described by using the LTE scenario merely as an example. Therefore, in this embodiment of this application, another name may be used in a future communications system (for example, 5G).

412. When the CU1 determines that the UE meets a handover condition, step 413 is executed.

Specifically, for the handover condition in step 412, refer to the foregoing description in step 309.

413. The CU1 controls the UE to perform a handover, and the UE hands over to a target cell.

414. Handover completion.

It should be noted that the steps in the foregoing handover procedure 400 are similar to corresponding steps in the handover procedure 300 described above, and for a specific execution process, refer to the foregoing description. For brevity, details are not described herein again.

Optionally, in an embodiment, a neighboring cell of a source cell further includes a second cell, and the second cell is a cell that does not send a measurement report to a controller of the source cell when it is determined that the cell cannot provide a second resource required by the terminal device.

In this embodiment of this application, after measuring a reference signal of the UE, a neighboring cell of the source cell does not send a measurement report to the source cell if determining, based on a resource and/or load status of the neighboring cell of the source cell, that there is no enough resource to admit the UE.

Correspondingly, the source cell can select the target cell from neighboring cells with sufficient resources. Compared with the prior art, in this manner, measurement reports on an X2 interface are reduced, and signaling overheads on the X2 interface can be further reduced. In addition, because a neighboring cell that is determined by the source cell as the target cell has enough resources to admit the UE, a handover failure probability can be reduced.

Optionally, in an embodiment, when a neighboring cell of the source cell determines that the neighboring cell cannot provide all second resources required by the terminal device, the neighboring cell may add indication information (that is, third indication information) to a measurement report to be sent to the source cell, to indicate, to the source cell, that the neighboring cell cannot provide all the second resources required by the terminal device.

Further, optionally, when a neighboring cell cannot provide all the second resources required by the terminal device, the neighboring cell may add fourth indication information to a measurement report, and the fourth indication information is used to indicate at least one of the following information:

congestion information, downspeeding information, optional feature information, and function information.

It should be understood that in this embodiment, when a neighboring cell cannot provide all the second resources required by the terminal device, in addition to indicating, to the source cell in the measurement report, that the neighboring cell does not have enough resources to admit the UE, the neighboring cell may further indicate, to the source cell, resources of the neighboring cell in the measurement report.

The congestion information is used to indicate a congestion status of air interface resources of the neighboring cell, for example, a sounding reference signal (Sounding Reference Signal, SRS) resource, a physical uplink control channel (Physical Uplink Control Channel, PUCCH) resource, and a user quantity. The downspeeding information is used to indicate whether the neighboring cell supports a guaranteed bit rate (Guaranteed Bit Rate, GBR) and a maximum bit rate (Maximum Bit Rate, MBR) of a user. The optional feature information is used to indicate a feature support capability of the neighboring cell, for example, dual carrier (Dual cell, DC), Multiple Input Multiple Output (Multiple-Input Multiple-Output, MIMO), and joint processing (Joint Processing, JP). The function information is slice information, for example, whether a machine type communication (Machine Type Communication, MTC) slice or an ultra-reliable and low latency communications (Ultra-reliable and Low Latency Communications, URLLC) slice is supported. The neighboring cell probably does not support a protocol stack configuration of the source cell, and in this case, the neighboring cell may indicate information about a special protocol stack configuration that is supported by the neighboring cell.

Figure 7:
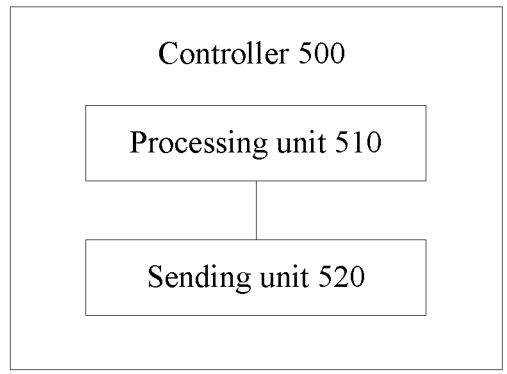
FIG. 7 is a schematic block diagram of a controller 500 according to an embodiment of this application.
Figure 8:
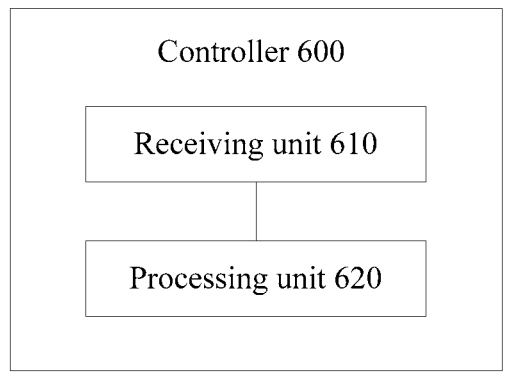
FIG. 8 is a schematic block diagram of a controller 600 according to another embodiment of this application.

With reference to FIG. 3 to FIG. 6, the foregoing describes in detail the inter-cell handover method according to the embodiments of this application. With reference to FIG. 7 and FIG. 8, the following describes the controller according to the embodiments of this application.

FIG. 7 is a schematic block diagram of a controller 500 according to an embodiment of this application. As shown in FIG. 7, the controller 500 includes:

a processing unit 510, configured to determine a target cell; and a sending unit 520, configured to send a pre-handover request to a second controller, where the second controller is a controller of the target cell, and the pre-handover request is used to instruct the second controller to allocate, to a terminal device, a first resource required for a cell handover; where the sending unit 520 is further configured to: when the processing unit 510 determines that the terminal device meets a handover condition, send a handover command to the terminal device, where the handover command is used to instruct the terminal device to be handed over from the source cell to the target cell based on the first resource.

The units of the controller 500 in this embodiment of this application and other operations or functions described above are separately used to implement a corresponding procedure executed by the first controller in the method 300. For brevity, details are not described herein.

In this embodiment of this application, when determining that the terminal device meets a measurement condition, the first controller (that is, the controller of the source cell) sends a pre-handover command to the second controller (that is, the controller of the target cell), to instruct the second controller to prepare resources for a cell handover of the terminal device. Therefore, when the terminal device meets the handover condition, the first controller can directly control the terminal device to perform the cell handover. This saves resource preparation time, thereby shortening a handover delay.

FIG. 8 is a schematic block diagram of a controller 600 according to another embodiment of this application. As shown in FIG. 8, the controller 600 includes:

a receiving unit 610, configured to receive a pre-handover request sent by a first controller, where the first controller is a controller of a source cell; and a processing unit 620, configured to allocate, based on the pre-handover request, a first resource required for a cell handover to the terminal device, so that the first controller sends a handover command to the terminal device when determining that the terminal device meets a handover condition, to instruct the terminal device to be handed over from the source cell to the target cell based on the first resource.

The units of the controller 600 in this embodiment of this application and other operations or functions described above are separately used to implement a corresponding procedure executed by the second controller in the method 300. For brevity, details are not described herein.

In this embodiment of this application, when determining that the terminal device meets a measurement condition, the first controller (that is, the controller of the source cell) sends a pre-handover command to the second controller (that is, the controller of the target cell). After receiving the pre-handover command, the second controller allocates (or referred to as reserve) a resource to the terminal device for a cell handover. Therefore, when the terminal device triggers the handover condition, the cell handover can be directly executed based on the allocated resource, and a handover delay can be shortened.

Figure 9:
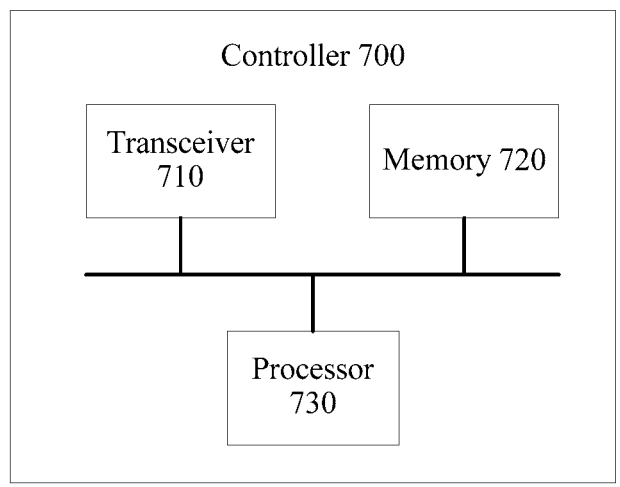
FIG. 9 is a schematic structural diagram of a controller 700 according to an embodiment of this application.
Figure 10:
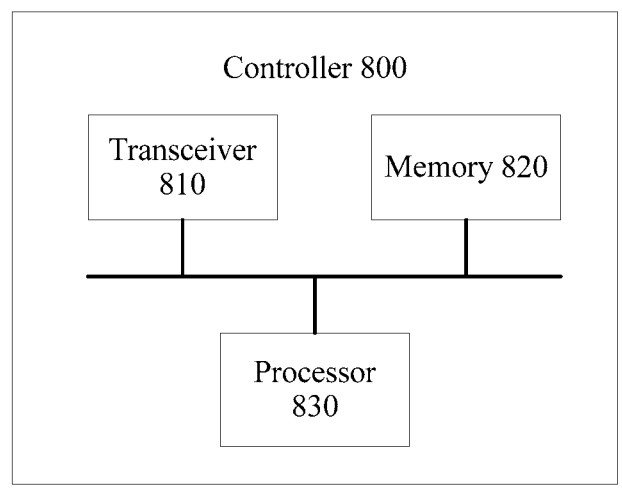
FIG. 10 is a schematic structural diagram of a controller 800 according to another embodiment of this application.

With reference to FIG. 3 to FIG. 6, the foregoing describes in detail the inter-cell handover method according to this embodiment of this application. With reference to FIG. 9 and FIG. 10, the following describes the controller according to the embodiments of this application.

FIG. 9 is a schematic structural diagram of a controller 700 according to an embodiment of this application. As shown in FIG. 9, the controller 700 includes:

a transceiver 710, configured to communicate with another device by receiving or sending data;

a memory 720, configured to store an instruction; and a processor 730, configured to execute the instruction in the memory 720, and when the instruction is executed, the transceiver 710 is configured to send a pre-handover request to a second controller, where the second controller is a controller of a target cell, and the pre-handover request is used to instruct the second controller to allocate, to a terminal device, a first resource required for a cell handover; where the transceiver 710 is further configured to: when the processor 730 determines that the terminal device meets a handover condition, send a handover command to the terminal device, where the handover command is used to instruct the terminal device to be handed over from the source cell to the target cell based on the first resource.

It should be understood that, the processor 730 in the embodiments of this application may be a central processing unit (Central Processing Unit, CPU), or the processor 730 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 720 may include a read-only memory and a random access memory, and provide an instruction and data for the processor 730. A part of the memory 720 may further include a nonvolatile random access memory. For example, the memory 720 may further store information about a device type.

In an implementation process, each step in the foregoing method may be completed by using an integrated logic circuit of hardware in the processor 730 or an instruction in a form of software. The steps of the inter-cell handover method disclosed with reference to the embodiments of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 720. The processor 730 reads information in the memory 720, and completes the steps of the foregoing method in combination with hardware of the processor 730. To avoid repetition, details are not described herein.

A function of the controller 700 in this embodiment of this application and the foregoing operation are separately used to implement a corresponding procedure executed by the first controller in the method 300. For brevity, details are not described herein.

In this embodiment of this application, when determining that the terminal device meets a measurement condition, the first controller (that is, the controller of the source cell) sends a pre-handover command to the second controller (that is, the controller of the target cell). After receiving the pre-handover command, the second controller allocates (or referred to as reserve) a resource to the terminal device for a cell handover. Therefore, when the terminal device triggers the handover condition, the cell handover can be directly executed based on the allocated resource, and a handover delay can be shortened.

FIG. 10 is a schematic structural diagram of a controller 800 according to another embodiment of this application. As shown in FIG. 10, the controller 800 includes:

a transceiver 810, configured to communicate with another device by receiving or sending data;

a memory 820, configured to store an instruction; and a processor 830, configured to execute the instruction in the memory 820, and when the instruction is executed, the transceiver 810 is configured to receive a pre-handover request sent by a first controller, where the first controller is a controller of a source cell in which a terminal device is located, and the controller 800 is a controller of a target cell; where the processor 830 is further configured to allocate, based on the pre-handover request, a first resource required for a cell handover to the terminal device, so that the first controller sends a handover command to the terminal device when determining that the terminal device meets a handover condition, to instruct the terminal device to be handed over from the source cell to the target cell based on the first resource.

It should be understood that the processor 830 in the embodiments of this application may be a central processing unit (Central Processing Unit, CPU), or the processor 830 may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, a discrete hardware component, or the like. The general purpose processor may be a microprocessor or the processor may be any conventional processor, or the like.

The memory 820 may include a read-only memory and a random access memory, and provide an instruction and data for the processor 830. A part of the memory 820 may further include a nonvolatile random access memory. For example, the memory 820 may further store information about a device type.

Optionally, the memories in the foregoing embodiments may be independent, or may be integrated with the processor. When the processor is implemented by hardware, for example, a logic circuit or an integrated circuit, the processor may be connected to other hardware without the memory.

In an implementation process, each step of the foregoing method may be completed by using an integrated logical circuit of hardware in the processor 830 or an instruction in a form of software. The steps of the inter-cell handover method disclosed with reference to the embodiments of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 820, and the processor 830 reads information in the memory 820 and implements the steps of the foregoing method in combination with hardware of the processor 830. To avoid repetition, details are not described herein.

A function of the controller 800 in this embodiment of this application and the foregoing operation are separately used to implement a corresponding procedure executed by the second controller in the method 300. For brevity, details are not described herein.

In this embodiment of this application, when determining that the terminal device meets a measurement condition, the first controller (that is, the controller of the source cell) sends a pre-handover command to the second controller (that is, the controller of the target cell). After receiving the pre-handover command, the second controller allocates (or referred to as reserve) a resource to the terminal device for a cell handover. Therefore, when the terminal device triggers the handover condition, the cell handover can be directly executed based on the allocated resource, and a handover delay can be shortened.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a U-disk, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter-cell handover method, wherein the method comprises:
    determining, by a first controller, a target cell, wherein the first controller is a controller of a source cell;
    sending, by the first controller, a pre-handover request to a second controller, wherein the second controller is a controller of the target cell, wherein the pre-handover request is configured for instructing the second controller to allocate, to a terminal device, a first resource required for a cell handover; and
    sending, by the first controller, a handover command to the terminal device when determining that the terminal device meets a handover condition, wherein the handover command is configured for instructing the terminal device to be handed over from the source cell to the target cell based on the first resource,
    wherein determining, by the first controller, the target cell comprises:
    sending, by the first controller, a measurement request message to a neighboring cell of the source cell, wherein the measurement request message carries first indication information, wherein the first indication information indicates a second resource that meets a quality of service requirement of the terminal device;
    receiving, by the first controller, at least one measurement report sent by at least one first cell, wherein the at least one measurement report is in a one-to-one correspondence with the at least one first cell, each measurement report comprises second indication information, the second indication information being configured for indicating a second resource that the corresponding first cell can provide for the terminal device, and the at least one first cell is some or all neighboring cells of the source cell; and
    determining, by the first controller, the target cell from the at least one first cell based on the second indication information in the at least one measurement report,
    wherein the neighboring cell of the source cell further comprises a second cell, the second cell being a cell that does not send a measurement report to the first controller when it is determined that the cell cannot provide the second resource required by the terminal device.

2. The method according to claim 1, wherein some of the at least one measurement report further comprise third indication information, wherein the third indication information indicates first cells corresponding to the some measurement reports cannot provide all second resources required by the terminal device.

3. The method according to claim 2, wherein the some measurement reports further comprise fourth indication information, wherein the fourth indication information indicates at least one of the following information:
    congestion information, downspeeding information, optional feature information, or function information.

4. An inter-cell handover method, comprising:
    receiving, by a second controller, a pre-handover request sent by a first controller, wherein the first controller is a controller of a source cell in which a terminal device is located, the second controller is a controller of a first cell, the first cell is a neighboring cell of the source cell, the pre-handover request is sent to the second controller after the first controller determines the first cell as a target cell; and
    allocating, by the second controller based on the pre-handover request, a first resource required for a cell handover to the terminal device, so that the first controller sends a handover command to the terminal device when determining that the terminal device meets a handover condition, to instruct the terminal device to be handed over from the source cell to the target cell based on the first resource,
    wherein before receiving, by the second controller, the pre-handover request sent by a first controller, the method further comprises:
    receiving, by the second controller, a measurement request message sent by the first controller, wherein the measurement request message carries first indication information, and the first indication information indicating a second resource that meets a quality of service requirement of the terminal device;
    determining, by the second controller, a second resource that the first cell can provide for the terminal device; and
    sending, by the second controller, a measurement report to the first controller, wherein the measurement report comprises second indication information, the second indication information indicating the second resource that the first cell can provide for the terminal device, wherein the measurement report further comprises fourth indication information, the fourth indication information indicating at least one of the following information:
congestion information, optional feature information, or function information.

5. The method according to claim 4, wherein the measurement report further comprises third indication information, the third indication information indicating that the first cell cannot provide all second resources required by the terminal device.

6. A controller, comprising:
a transceiver;
a memory, configured to store an instruction; and
a processor connected to both the transceiver and the memory, configured to execute the instruction stored in the memory, to perform the following when the instruction is executed:
determining a target cell, wherein the controller is a controller of a source cell; and;
wherein, the transceiver is configured to:
send a pre-handover request to a second controller, wherein the pre-handover request is configured for instructing the second controller to allocate, to a terminal device, a first resource required for a cell handover; and
when the processor determines that the terminal device meets a handover condition, send a handover command to the terminal device, wherein the handover command is used to instruct the terminal device to be handed over from the source cell to the target cell based on the first resource,
wherein the transceiver is configured to:
send a measurement request message to a neighboring cell of the source cell, wherein the measurement request message carries first indication information, and the first indication information indicates a second resource that meets a quality of service requirement of the terminal device; and
receive at least one measurement report sent by at least one first cell, wherein the at least one measurement report is in a one-to-one correspondence with the at least one first cell, each measurement report comprises second indication information, the second indication information indicates a second resource that the corresponding first cell can provide for the terminal device, and the at least one first cell is some or all neighboring cells of the source cell; and
the processor is configured to:
determine the target cell from the at least one first cell based on the second indication information in the at least one measurement report,
wherein the neighboring cell of the source cell further comprises a second cell, and the second cell is a cell that does not send a measurement report to the first controller when it is determined that the cell cannot provide the second resource required by the terminal device.

7. The controller according to claim 6, wherein some of the at least one measurement report further comprise third indication information, and the third indication information is used to indicate that first cells corresponding to the some measurement reports cannot provide all second resources required by the terminal device.

8. The controller according to claim 7, wherein the some measurement reports further comprise fourth indication information, wherein the fourth indication information indicates at least one of the following information:
congestion information, downspeeding information, optional feature information, and function information.

* * * * *